United States Patent Office 3,175,404
Patented Mar. 30, 1965

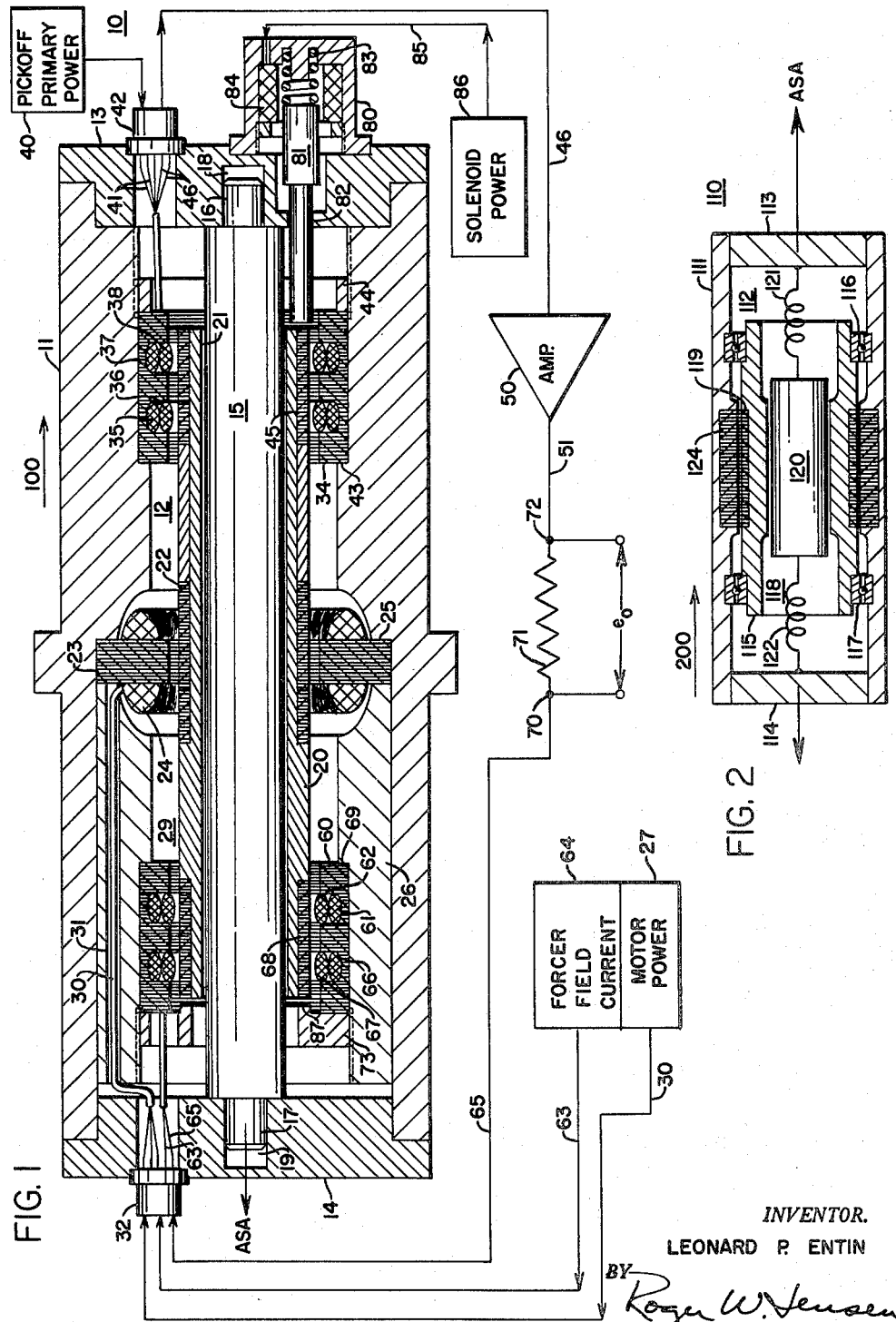

3,175,404
ACCELEROMETER
Leonard P. Entin, Wayland, Mass., assignor to Honeywell Inc., a corporation of Delaware
Filed Dec. 15, 1960, Ser. No. 76,038
1 Claim. (Cl. 73—516)

This invention relates to linear accelerometers, and more particularly to linear accelerometers utilizing a hydrodynamically supported seismic mass in combination with means for sensing movement of the seismic mass and means for tending to restore the seismic mass to its original position.

In the development of linear accelerometers, the state of art has progressed tremendously in the last few years. The progress has followed the logical theory of producing an improved accelerometer by reducing the amount of friction between the seismic mass (sensor) and its support. The liquid supported mass accelerometer was an important scientific breakthrough in accelerometer technology. After much research and effort, some attempts have been made recently to support the seismic mass with air bearings to further reduce the frictional effects of the means of support. However, all the attempts to utilize an air bearing type of accelerometer have been restricted to the hydrostatic support of the seismic mass element. That is to say, that the high pressure of the air supporting the seismic mass element in the accelerometer is generated by some external means and is pumped into the bearing surface area to support the seismic mass element. Theoretically, hydrostatic support of the seismic mass element would be expected to give a very sensitive accelerometer, one of which is disclosed in the patent to R. L. Cosgriff et al. 2,591,921. As a practical matter, however, there are several serious problems in attempting to mechanize an accelerometer of this type. One of the problems involved is that externally pressurized fluid directed against the seismic mass introduces forces which tend to move the seismic mass in one direction or another away from the null signal position and introduce an error signal. Ideally, there would be no such forces applied in a hydrostatically supported seismic mass, but this is very difficult, if not impossible, to achieve in practice. In addition, the remotely located pressure source adds to the complexity of the system. All of these problems, of course, limit the sensitivity and effectiveness of any accelerometer utilizing a hydrostatically supported seismic mass element.

The present invention, however, eliminates the serious difficulties encountered in an accelerometer utilizing hydrostatic support of the seismic mass element. This is accomplished by supporting the seismic mass element of the accelerometer hydrodynamically. Hydrodynamic support is defined as the fluid pressure support of a member relative to its support in which the fluid pressure is generated by the relative movement of the member and its support. This is vastly different from hydrostatic support which is defined as the fluid pressure support of a member relative to its support in which the fluid pressure is generated by an external means and is pumped between the member and its support.

In the preferred embodiment of the applicant's invention, the seismic mass element consists of a hollow thin cylindrical member which surrounds an elongated shaft or support member. Means are provided for rotating the seismic mass element about the shaft at a relatively constant speed and conditions of radial clearance, fluid viscosity, and fluid pressure are such that hydrodynamic support of the seismic mass element is accomplished. The seismic mass is thus mechanically unrestrained axially; and it is axially displaced relative to the support member in response to any linear accelerations applied to the support member. Since the seismic element is axially mechanically unrestrained, an acceleration of the support means would cause continued relative axial movement between the mass element and the support element, therefore to obtain an operable device it is necessary that the seismic mass element be servo-restrained. Means are provided for sensing the relative axial position of the seismic mass element and for producing a signal indicative thereof. The signal is fed through suitable circuit means to the input of an amplifier means; the output of the amplifier is then applied through additional circuit means to a forcer means. The forcer means applies a force tending to oppose the relative axial displacement of the seismic mass means in response to the signal of the pickoff means. It should be understood, that a signal indicative of the acceleration of said support member is indicated by the voltage drop across a resistor in the feedback loop. With this principle of operation, the applicant's invention is capable of extreme accuracy, and is also suitable for extreme miniaturization.

It is therefore an object of this invention to provide an improved accelerometer.

A further object of this invention is to provide a linear accelerometer utilizing the hydrodynamic support of the seismic mass element and a force rebalance servo loop.

These and other objects of the invention will become apparent from a study of the accompanying specification and claim in conjunction with the drawing in which:

FIGURE 1 is a cross section of the preferred embodiment of the applicant's invention; and FIGURE 2 is a cross section of an alternate embodiment of the applicant's invention.

Referring now to FIGURE 1, reference numeral 10 generally identifies an acceleration sensor comprising a base or housing member 11 having a general bore 12 therethrough. Two end caps 13 and 14 are attached to housing member 11 by suitable means (not shown). A shaft or support member 15 is rigidly attached to the end caps 13 and 14 by pressing reduced diameter portions 16 and 17 on either end of the shaft or support member 15 into suitable recesses 18 and 19 located in end caps 13 and 14 respectively. The longitudinal axis of shaft 15 thus defines an acceleration sensitive axis (ASA). A seismic mass member 20 is provided and comprises a long thin cylindrical element which has a bore 21 slightly larger than the circumference of the shaft member 15. The clearance between shaft 15 and the bore 21 of seismic mass 20 is on the order of 0.00010 inch. A motor hysteresis ring 22 is cemented by suitable means to the outer periphery of the seismic mass element 20 and is positioned generally in the center of the longitudinal axis of the seismic mass element 20 has a short axial extent relative thereto. A motor stator 23 cooperates with the motor hysteresis ring 22 to cause rotation of the seismic mass element 20. The stator 23 is wound with suitable motor windings 24. The wound motor stator 23 is positioned against a shoulder 25 of housing member 11 and cemented to the housing 11 in this position. A sleeve member 26 having a general bore 29 therethrough is placed within bore 12 abutting the motor stator 23 and is also cemented to the housing member 11. It is clear that the motor stator 23 is held in the position shown in FIGURE 1 by the shoulder 25 of housing 11 and the sleeve member 26. Motor leads 30 are brought into the motor windings 24 through a hole 31 in the sleeve 26. The motor leads are connected to a source of power 27 and are brought into housing member 11 through a hermetically sealed connector 32 located in end cap 14. It should be pointed out that the hysteresis ring 22 has a much greater axial extent than the stator 23 so that the seimic mass element 20 will have no preferred axial position due to electromagnetic forces which might result from asymmetrical fringing.

Means are provided for sensing the axial position of seismic mass element 20 relative to said shaft 15 or housing element 11 which may take a number of forms which are well known in the art. That is to say, the pickoff means may be a capacitive type, an inductive type, or an optical type, depending upon the particular type desired. The pickoff means rather schematically illustrated in FIGURE 1, is the inductive type and comprises a linear variable differential transformer. A stator assembly 34 of the differential transformer is wound with two primary windings 35 and 37 and two secondary windings 36 and 38. The primary windings 35 and 37 are connected to an A.C. power source 40 by suitable leads 41, which are brought into housing 11 through a hermetically sealed connector 42 located in the end cap 13. As a practical matter, all of the leads for the acceleration sensor 10 could be brought into housing 11 through a single hermetic lead sealed connector if desired rather than using a plurality of connectors as shown in FIGURE 1. The pickoff stator assembly 34 is positioned within the bore 12 and abutting against a shoulder 43 of the housing 11. The pickoff stator 34 is held against the shoulder 43 by a threaded pickoff lock ring 44 which is threadably engaged with housing member 11. Pickoff stator assembly 34 cooperates with a pickoff armature 45, which is located as shown in FIGURE 1 on the right end of seismic mass element 20, to produce a signal indicative of the axial position of seismic mass element 20. The pickoff armature 45 is the usual laminated type of permeable material and is attached to the outer circumference of seismic mass element 20 by a suitable adhesive or cement. Pickoff armature 45 also has a short axial extent relative to said mass element 20. The pickoff means secondary windings 36 and 38 are connected by suitable leads 46 to the input of an amplifier means 50. The output of the amplifier means 50 is connected by suitable circuit means to a forcer means which will presently be described.

The forcer means utilized in the applicant's invention may be any one of a number of various well-known forcing means. The particular forcer means shown rather schematically in FIGURE 1 is the constant field excitation type and delivers a force proportional to its control current. It should be understood that a number of various designs may be utilized to this end. More sophisticated systems may also be used, for example, digital forcing. The forcer means illustrated in FIGURE 1 comprise a forcer stator assembly 60 including forcer control windings 61 and 66 and forcer field windings 62 and 67. Forcer stator 60 is positioned within bore 29 and is abutted against a shoulder 69 located therein. Forcer stator 60 is maintained in this position by a forcer locker ring 73 which is threadably engaged with sleeve member 26. The forcer field windings 62 and 67 are connected through a suitable lead means 63 to an A.C. power source 64. The forcer control windings 61 and 66 are connected through suitable circuit means including lead means 65 to the output of amplifier means 50. It should be pointed out, that the lead means 63 and 65 are brought into the housing 11 through the hermetically sealed connector 32. The circuit means connecting control windings 61 and 66 to the output of amplifier means also includes a readout resistor 71. Lead 65 connects to one terminal 70 of the output resistance means 71. The other terminal of output resistance means 71 is identified as reference numeral 72 and is connected to a lead 51 which connects to the output of amplifier means 50.

A caging means is also schematically disclosed in FIGURE 1 and comprises a caging housing 80 attached to end cap 13. Caging housing 80 contains a solenoid plunger 81 which is aligned with an opening 82 in end cap 13. Also contained in caging housing 80 is a solenoid spring 83 and a solenoid winding 84. A caging stop surface 87 is provided on forcer locker ring 73. Solenoid winding 84 is connected through a suitable lead 85 to a source of power 86. The lead 85 is brought out of the caging housing 80 through a hermetically sealed connector (not shown). When solenoid winding 84 is energized from power source 86, plunger 81 becomes magnetized and the mutual action of the magnetic field set up by winding 84 on the "poles" created on the plunger 81, causes the plunger 81 to be held (against the biasing force of spring 83) in the position shown FIGURE 1. When solenoid winding 84 is not energized, spring 83 forces plunger 81 to the left as viewed in FIGURE 1, which in turn forces seismic mass 20 to the left against a caging stop surface 87. Seismic mass element 20 is thereby firmly held against the stop surface 87 so as to prevent damage to the mass element due to disturbances such as transportation shocks and vibrations, when the spinmotor is not operating. It should be noted that any suitable type of caging means may be utilized, and the caging means, above described, is only one such type. It is also possible in some applications to eliminate the caging means.

*Operation*

In FIGURE 1, the acceleration sensitive axis is depicted by the arrow ASA which is also the longitudinal axis of the shaft or support member 15 which is defined by the reduced diameter portions thereof 16 and 17 and the recesses 18 and 19 of the end caps 13 and 14 respectively. The acceleration responsive device 10, in operation would be mounted on a device such as an aircraft of which the measurement of the acceleration was desired. The housing or base 11 in some cases would be rigidly secured to the carrying vehicle and in other cases would be mounted on some movable mechanism such as a stabilized platform for use in an inertial guidance system. While motor winding 24 is excited through leads 30 from an A.C. source, a rotating flux field is developed in the motor stator which coacts with the hysteresis ring 22 attached to the seismic mass 20 to drive the mass element at a substantially constant speed relative to support or shaft 15. Conditions of radial clearance, ambient fluid viscosity, and fluid pressure are such that mass element 20 is caused to be hydrodynamically supported relative to shaft element 15. It is clear that the fluid pressure which is supporting the seismic mass element 20 relative to shaft 15 is generated or developed by the relative rotation therebetween. The proper selection of bearing parameters for a given embodiment of the present invention is made by following well known principles of hydrodynamic bearings utilized by those skilled in this art. Generally, from a mathematical standpoint, the parameters of viscosity, density, and clearance may be expressed in a particular form of the Navier-Stokes equations. These parameters are a function of temperature and pressure and the elastic behavior of the bearing surfaces. The relationship of the parameters is clearly set forth in Analysis and Lubrication of Bearings by M. C. Shaw and F. Macks. Further references are set forth in A Survey of Journal Bearing Literature by D. D. Fuller. Hydrodynamic support is by definition fluid pressure support of the member in which the fluid pressure is generated by the relative movement of the member and its support and should be differentiated from hydrostatic support in which the pressure to support the elements is developed in an external source and pumped into the member for support thereof.

In the absence of any acceleration along the ASA, it will be noted that the seismic mass element 20 has a normal axial position relative to said shaft 15 or housing 11. This normal position is the position illustrated in FIGURE 1, in which seismic mass element is centered with respect to shaft 15 such that limited movement of seismic mass element 20 is permitted in either direction along the ASA. As shown in the drawing, the hysteresis ring 22 has a greater axial extent than the stator assembly 23 of the motor so that the seismic mass assembly 20 will have no preferred axial position due to electromagnetic forces which might result from asymmetrical fringing.

Upon acceleration of housing 11 in the direction of the arrow 100 as shown in FIGURE 1, seismic mass element 20 will be axially displaced relative to said shaft 15 or housing 11. Seismic mass 20 will appear as viewed in FIGURE 1 to have moved to the left relative to the housing 11. What actually takes place is that housing 11 is moved to the right and seismic mass 20, being hydrodynamically supported with respect to support 15 and being totally mechanically unrestrained along said shaft 15, follows Newton's first law of motion and tends to remain in its initial position until acted on by some external force. As soon as there is axial movement of seismic mass element 20 relative to said support 15 or housing 11, the movement is sensed by the pickoff means.

The pickoff means functions in the following manner: primary windings 35 and 37 are connected in series and are energized by an A.C. power source 40 through lead means 41. The excitation of primary coils 35 and 37 causes a magnetic flux to be set up surrounding the windings in the usual manner. It should be noted that primary winding 35 and primary winding 37 completely encircle the pickoff armature 45 located on the seismic mass element 20. The pickoff means secondary windings 36 and 38 lie in the same planes as primary windings 35 and 37 respectively, however, the secondary windings 36 and 38 are connected in opposition. When seismic mass element 20 is in the central or normal or null position, both secondary winding 36 and secondary winding 38 are linked by the same number of magnetic lines of force and hence have an equal voltage induced therein. The net voltage of the secondary windings 36 and 38, which are connected in opposition is therefore zero, when seismic mass element 20 is at its normal or null position as shown in FIGURE 1. When seismic mass element 20 and therefore pickoff armature 45 are displaced to the left as viewed in FIGURE 1 relative to said pickoff means due to acceleration 100, there is an increase in reluctance in the magnetic circuit between primary winding 37 and pickoff armature 45, and at the same time there is a decrease in reluctance in the magnetic circuit between primary winding 35 and pickoff armature 45. The result is a decrease in the voltage induced in secondary winding 38 and an increase in the voltage induced in winding 36; since windings 36 and 38 are connected in opposition, the voltages induced therein no longer cancel one another. There is a net voltage output between windings 36 and 38 which is indicative of the axial displacement or position of seismic mass element 20.

This output signal is applied to the input of amplifier means 50 through suitable lead means 46. The output of amplifier means 50 is connected by suitable lead means 51 to terminal 72 of readout resistor 71; the other terminal of readout resistor 71 is identified by reference numeral 70. Terminal 70 of readout resistor 71 is connected through suitable lead means 65 to the forcer control windings 62 and 67.

The forcer design is such that with a constant field excitation, it generates a force proportional to the control current. The field windings 61 and 66 of the forcer means are energized from an A.C. power source 64 through lead means 63, and are connected in series. It will be noted that since field windings 61 and 66 are connected in series, the net force exerted on forcer armature 68 and hence on seismic mass 20 by the field windings is zero.

As previously stated, the control windings 62 and 67 are connected to the output of amplifier means 50, and the input of amplifier means 50 is connected to the pickoff means. Therefore as seismic mass element 20 is displaced to the left due to acceleration 100, a pickoff signal is conducted through suitable conductor means 46 to input of amplifier means 50. The output of amplifier means 50 is connected through suitable circuitry to the control windings 62 and 67. Control windings 62 and 67 are connected so that a current therein will set up a flux field which will oppose or reinforce the flux fields due to the current in field windings 61 and 66 respectively. The energization of control windings 62 and 67 by the output of amplifier means 50, causes a flux field to be set up by winding 67 which is opposing the flux field set up by field winding 66 and a flux field to be set up by winding 62 which is reinforcing the flux field set up by field winding 61. The net result is a flux field which reacts with forcer armature 68 to apply an axial force to the armature and seismic mass element 20 tending to force seismic mass element 20 to the right, towards its normal position and opposing the relative displacement of seismic mass 20, due to the acceleration 100 of the housing 11. It will be understood that the signal generated by the pickoff means is connected to the forcer means through the amplifier means 50 and causes a force to be applied to seismic mass 20 to exactly balance the force upon seismic mass 20, due to the acceleration of the housing 11. In this force-rebalance acceleration sensor, the force exerted on the mass 20 by the forcer means is equal and opposite to the force exerted in the mass 20, due to the acceleration of the housing 11. In which case, the force (F) exerted on the seismic mass element is equal to the initial force (MA) of the seismic mass element, where M is the mass of the seismic mass element 20 and A is the acceleration of the acceleration sensor or housing 11. It follows that the signal received by the control windings of the forcer means is proportional to the acceleration of the acceleration sensor 10, and therefore a signal indicative of the acceleration of the sensor 10 is read out across the terminals 72 and 70 of the readout resistor 71 and is indicated as $e_o$ in FIGURE 1.

Referring now to FIGURE 2, reference numeral 110 generally identifies an alternate embodiment of the applicant's invention. Acceleration sensor 110 comprises a base or housing member 111 having a general bore 112 therethrough. Two end caps 113 and 114, are attached to housing member 111 by a suitable means (not shown). A support member 115 having a general bore 118 therethrough is rotatably monuted on housing member 111 by means of bearings 116 and 117. The longitudinal axis of support means 115 defines an acceleration sensitive axis (ASA). A motor means is provided to rotate support means 115 at a substantially constant velocity relative to housing means 111. The motor means comprises a wound stator 124 which is attached to housing means 111 by suitable means (not shown) and a hysteresis ring 119 which is attached by suitable means (not shown) to support member 115. A cylindrical seismic mass element 120 which has a slightly smaller cross-sectional area than bore 118 is positioned within bore 118 of support member 115 and is connected to housing 111 by means of helical springs 121 and 122. It should be pointed out, that there is a small clearance between the bore 118 and the periphery of seismic mass element 120. A suitable pickoff means would also be provided in this alternate embodiment shown in FIGURE 2 and may be of any one of a number of well-known types; however, since the details of the pickoff means do not constitute an essential part of the present invention, the pickoff means have been omitted from FIGURE 2 for the sake of clarity of illustration.

In operation, the acceleration sensor 110 would be mounted on a device such as an aircraft of which the measurement of the acceleration was desired. The housing or base 111 in some cases would be rigidly secured to the carrying vehicle and in other cases, would be mounted on some movable mechanism such as a stabilized platform for use in an internal guidance system. The excitation of the stator 124 from a suitable source of power causes a rotating flux field to be developed which coacts with the hysteresis ring 122 mounted on supporting element 115 so that a supporting element 115 is rotated at a substantially constant velocity relative to the housing 111. As support member 115 is rotated, the fluid within the clearance between the support member 115 and the seismic mass element 120 exerts a viscous drag on the seismic mass element 120 and tends to rotate it in the same direction as the support element 115. However, since the seismic mass element 120 is connected to housing element 111 by helical springs 121 and 122, it can only rotate a limited amount before it is restrained by the springs. Consequently, after springs 121 and 122 are rotated this limited amount, mass element 120 does not rotate relative to the housing 111. The relative rotational movement between the support member 115 and the seismic mass element 120 causes the seismic mass element to become hydrodynamically supported relative to the support member 115. It should be noted that the mass element 120 is mechanically unrestrained for movement along the ASA except for the helical springs 121 and 122.

If the acceleration sensor 110 were now subjected to an acceleration in the direction of arrow 200 of FIGURE 2, it is clear that the seismic mass element 120 would tend to remain at rest and the housing 111 would be moved to the right relative to the seismic mass element 120. The acceleration sensor 110 functions as a linear accelerometer and the displacement of the seismic mass, limited by helical springs 121 and 122, relative to the housing 111 is indicative of the amount of linear acceleration of the sensor 110. The hydrodynamic support of mass element 120 eliminates all of the frictional forces involved in the prior art accelerometers due to the support of the seismic mass element.

While I have shown as described specific embodiments of this invention, further modification and improvements will occur to those skilled in art. I desire to be understood, therefore, that this invention is not limited to the forms shown, and I intend in the appended claim to cover all modifications which do not depart from the spirit of the scope of this invention.

What is claim is:

A linear force-rebalance accelerometer comprising:
a housing having an elongated chamber therein;
a cylindrical elongated shaft;
a cylindrical seismic mass element having a bore therethrough slightly larger than said shaft, said shaft being positioned through said bore in said mass element, said shaft being positioned within said chamber and rigidly attached to said housing so as to prevent rotation therebetween, and a longitudinal axis of said shaft defining an acceleration sensitive axis;
a motor rotor means rigidly attached to the periphery of said mass element intermediate the ends thereof;
a motor stator rigidly attached to said housing, said stator being radially spaced from and circumferentially surrounding said rotor means, said rotor means and said stator being operable to rotate said mass element relative to said shaft about said axis, said mass element and said shaft coacting upon relative rotation of said mass element and said shaft such that said mass element is hydrodynamically supported, said mass element being mechanically unrestrained for movement along said axis, said mass element being unrestrained for rotation about said axis, and said mass element having a normal axial position relative to said housing;
pickoff means positioned contiguous one end of said mass element, said pickoff means being adapted to produce a signal indicative of the axial movement of said mass element relative to said normal position;
forcer means positioned contiguous the other end of said mass element;
means connecting said pickoff means and said forcer means including amplifier means, said forcer means being adapted to be energized by said signal to apply a force to said mass element tending to return it to said normal position upon axial movement therefrom; and
caging means, said caging means being selectively controlled so as to prevent axial movement of said mass element.

References Cited by the Examiner
UNITED STATES PATENTS

| | | | |
|---|---|---|---|
| 2,591,921 | 4/52 | Cosgriff et al. | 73—516 |
| 2,603,726 | 7/52 | McLean | 73—503 |
| 2,840,366 | 6/58 | Wing | 73—516 |
| 2,948,152 | 8/60 | Meyer | 73—514 |
| 3,035,449 | 5/62 | Hollmann | 73—490 |
| 3,048,043 | 8/62 | Slater | 308—9 |
| 3,068,704 | 12/62 | Parker | 73—516 |

RICHARD C. QUEISSER, *Primary Examiner.*

S. FEINBERG, SAMUEL LEVINE, JOSEPH P. STRIZAK, *Examiners.*